(12) United States Patent
Malik et al.

(10) Patent No.: US 8,671,294 B2
(45) Date of Patent: Mar. 11, 2014

(54) ENVIRONMENTALLY COGNIZANT POWER MANAGEMENT

(75) Inventors: Naim R. Malik, Somerset, NJ (US); Vsevolod Onyshkevych, Princeton, NJ (US); Christian Paetz, Zwickau (DE); Siva Somasundaram, Dayton, NJ (US); Neil Weinstock, Randolph, NJ (US); Allen Yang, Bridgewater, NJ (US)

(73) Assignee: Raritan Americas, Inc., Somerset, NJ (US)

( * ) Notice: Subject to any disclaimer, the term of this patent is extended or adjusted under 35 U.S.C. 154(b) by 832 days.

(21) Appl. No.: 12/044,530

(22) Filed: Mar. 7, 2008

(65) Prior Publication Data

US 2009/0228726 A1 Sep. 10, 2009

(51) Int. Cl.
*G06F 1/26* (2006.01)

(52) U.S. Cl.
USPC .......................................... 713/320; 713/321

(58) Field of Classification Search
USPC ........... 713/300, 320, 321, 323, 340; 700/295
See application file for complete search history.

(56) References Cited

U.S. PATENT DOCUMENTS

| 4,321,582 | A | | 3/1982 | Banghart | |
|---|---|---|---|---|---|
| 4,543,649 | A | | 9/1985 | Head et al. | |
| 4,955,821 | A | | 9/1990 | Bernardini | |
| 5,515,853 | A | | 5/1996 | Smith et al. | |
| 5,719,800 | A | * | 2/1998 | Mittal et al. | 713/321 |
| 5,964,879 | A | * | 10/1999 | Dunstan et al. | 713/340 |
| 6,167,330 | A | * | 12/2000 | Linderman | 700/295 |
| 6,229,899 | B1 | | 5/2001 | Norris et al. | |
| 6,413,104 | B1 | | 7/2002 | Bernardini | |
| 6,476,728 | B1 | | 11/2002 | Sakakibara | |
| 6,499,102 | B1 | | 12/2002 | Ewertz | |
| 6,553,336 | B1 | | 4/2003 | Johnson et al. | |
| 6,567,769 | B2 | | 5/2003 | Chang | |
| 6,697,300 | B1 | | 2/2004 | Holt | |
| 6,983,210 | B2 | | 1/2006 | Matsubayashi | |
| 6,985,697 | B2 | | 1/2006 | Smith | |
| 6,986,069 | B2 | * | 1/2006 | Oehler et al. | 713/320 |
| 7,032,119 | B2 | | 4/2006 | Fung | |
| 7,248,978 | B2 | | 7/2007 | Ransom | |
| 7,272,735 | B2 | | 9/2007 | Fung | |
| 7,295,556 | B2 | | 11/2007 | Roese et al. | |
| 7,444,526 | B2 | * | 10/2008 | Felter et al. | 713/300 |
| 7,802,120 | B2 | * | 9/2010 | Conroy et al. | 713/340 |
| 7,853,816 | B2 | | 12/2010 | Tanaka | |
| 2002/0007463 | A1 | * | 1/2002 | Fung | 713/320 |
| 2002/0156600 | A1 | | 10/2002 | Chang | |

(Continued)

FOREIGN PATENT DOCUMENTS

| EP | 1489719 A2 | 12/2004 |
|---|---|---|
| GB | 2423168 A | 8/2006 |

(Continued)

OTHER PUBLICATIONS

The International Search Report and Written Opinion by the International Searching Authority, issued on Nov. 25, 2009, in the PCT application No. PCT/US09/61521.

(Continued)

*Primary Examiner* — Khanh Dang (57) ABSTRACT

A method for environmentally cognizant power management that gathers server, application and environmental information from different devices to compute an aggregate behavior model.

19 Claims, 4 Drawing Sheets

(56) References Cited

U.S. PATENT DOCUMENTS

| | | | |
|---|---|---|---|
| 2003/0124999 | A1 | 7/2003 | Parssinen |
| 2003/0193777 | A1 | 10/2003 | Friedrich |
| 2003/0204759 | A1 | 10/2003 | Singh |
| 2004/0003303 | A1* | 1/2004 | Oehler et al. ............... 713/300 |
| 2004/0051397 | A1 | 3/2004 | Juntunen |
| 2004/0064745 | A1* | 4/2004 | Kadambi .................... 713/322 |
| 2004/0163001 | A1 | 8/2004 | Bodas |
| 2004/0167732 | A1 | 8/2004 | Spitaels |
| 2004/0267897 | A1 | 12/2004 | Hill |
| 2005/0102539 | A1* | 5/2005 | Hepner et al. .............. 713/300 |
| 2005/0143865 | A1* | 6/2005 | Gardner ..................... 700/291 |
| 2005/0223090 | A1 | 10/2005 | Ewing |
| 2005/0283624 | A1 | 12/2005 | Kumar |
| 2006/0005057 | A1* | 1/2006 | Nalawadi et al. ........... 713/320 |
| 2006/0013070 | A1 | 1/2006 | Holm |
| 2006/0072271 | A1 | 4/2006 | Jones et al. |
| 2006/0085854 | A1 | 4/2006 | Agrawal et al. |
| 2006/0103504 | A1 | 5/2006 | Vassallo |
| 2006/0112286 | A1 | 5/2006 | Whalley et al. |
| 2006/0168975 | A1 | 8/2006 | Malone et al. |
| 2006/0184935 | A1 | 8/2006 | Abels |
| 2006/0184936 | A1 | 8/2006 | Abels |
| 2006/0184937 | A1 | 8/2006 | Abels |
| 2006/0259621 | A1 | 11/2006 | Ranganathan |
| 2006/0265192 | A1 | 11/2006 | Turicchi |
| 2006/0288241 | A1 | 12/2006 | Felter |
| 2007/0010916 | A1 | 1/2007 | Rodgers |
| 2007/0019626 | A1 | 1/2007 | Lahiri |
| 2007/0038414 | A1 | 2/2007 | Rasmussen |
| 2007/0040582 | A1 | 2/2007 | Gross |
| 2007/0078635 | A1 | 4/2007 | Rasmussen et al. |
| 2007/0136453 | A1 | 6/2007 | Ewing |
| 2007/0150215 | A1 | 6/2007 | Spitaels |
| 2007/0180117 | A1 | 8/2007 | Matsumoto |
| 2007/0240006 | A1 | 10/2007 | Fung |
| 2007/0245165 | A1 | 10/2007 | Fung |
| 2007/0260897 | A1 | 11/2007 | Cochran |
| 2007/0273208 | A1 | 11/2007 | Menas |
| 2008/0052145 | A1 | 2/2008 | Kaplan |
| 2008/0148075 | A1 | 6/2008 | Reder et al. |
| 2008/0170471 | A1 | 7/2008 | Rolet et al. |
| 2008/0238404 | A1 | 10/2008 | Ferguson |
| 2008/0244281 | A1 | 10/2008 | Felter |
| 2008/0270077 | A1 | 10/2008 | Ozonat et al. |
| 2008/0317021 | A1 | 12/2008 | Ives |
| 2009/0207694 | A1 | 8/2009 | Guigne et al. |
| 2009/0234512 | A1 | 9/2009 | Ewing |
| 2010/0214873 | A1 | 8/2010 | Somasundaram et al. |

FOREIGN PATENT DOCUMENTS

| | | |
|---|---|---|
| GB | 2437846 | 11/2007 |
| JP | 05-250188 | 9/1993 |
| JP | 6221649 | 8/1994 |
| JP | 2005198364 | 7/2005 |
| JP | 2005323438 | 11/2005 |
| JP | 2006025474 | 1/2006 |
| JP | 2007139523 | 6/2007 |
| JP | 2007299624 | 11/2007 |
| WO | WO 2004074983 A2 | 9/2004 |
| WO | 2006/089905 | 8/2006 |
| WO | WO 2006119248 A2 | 11/2006 |
| WO | 2007072458 | 1/2007 |
| WO | 2007021392 | 2/2007 |
| WO | 2007024403 | 3/2007 |
| WO | 2010048205 | 4/2010 |

OTHER PUBLICATIONS

The International Search Report and Written Opinion by the International Searching Authority, issued on Apr. 21, 2009, in the PCT application No. PCT/US09/36299.

The International Search Report and Written Opinion by the International Searching Authority, issued on Aug. 7, 2008, in the PCT application No. PCT/US08/05533.

The International Search Report and Written Opinion by the International Searching Authority, issued on Sep. 8, 2008, in the PCT application No. PCT1US081069422.

The International Search Report and Written Opinion by the International Searching Authority, issued on Dec. 18, 2009, in the PCT application No. PCT/US09/61354.

Office Action mailed on Mar. 7, 2011 in related U.S. Appl. No. 12/168,504.

The extended European Search Report by the European Patent Office, issued on Aug. 2, 2012, in the related European patent application No. 09822648.3.

Office Action, mailed on Sep. 14, 2012, in related U.S. Appl. No. 12/603,322.

The extended European Search Report by the European Patent Office, issued on Jan. 16, 2012, in the corresponding European patent application No. 09716608.6.

Office Actions mailed on Jun. 16, 2011 and Feb. 23, 2012 in related U.S. Appl. No. 12/112,435.

Office Action mailed on Feb. 28, 2012 in related U.S. Appl. No. 12/168,504.

Office Action mailed on Dec. 13, 2011 in related U.S. Appl. No. 12/603,322.

Office Actions mailed on Dec. 7, 2011 and Jun. 28, 2012 in related U.S. Appl. No. 12/582,480.

Moore et al., "Weatherman: Automated, online, and predictive thermal mapping and management for data centers," Jan. 1 2006, Autonomic Computing, 2006. ICAC '06. IEEE International Conference on Dublin, Ireland Jun. 13-16, 2006.

Raghavendra et al., "No "Power" Struggles: Coordinated Multi-level Power Management for the Data Center," http://www.hpl.hp.com/echreports/2007/HPL-2007-194.pdf, Mar. 1, 2008.

The Chinese Office Action, issued on Nov. 5, 2012, in the related Chinese Patent Application No. 200980142324.6.

The Chinese Office Action, issued on Apr. 26, 2013, in the related Chinese Patent Application No. 200980149075.3.

The Chinese Office Action, issued on Jan. 14, 2013, in the related Chinese Patent Application No. 200880131103.4.

The Chinese Office Action, issued on Feb. 16, 2013, in the related Chinese Patent Application No. 200880129788.9.

Office Actions, mailed on Nov. 16, 2012 and Jul. 17, 2013, in related U.S. Appl. No. 12/112,435.

Office Action, mailed on Aug. 29, 2013, in related U.S. Appl. No. 12/168,504.

Office Actions, mailed on Dec. 10, 2012, in related U.S. Pat. Appl. No. 12/603,322.

Office Actions, mailed on May 24, 2013 and Sep. 13, 2013, in related U.S. Appl. No. 12/582,480.

Office Actions, mailed on Apr. 19, 2013, in related U.S. Appl. No. 13/790,601.

The English translation of the Japanese Office Action issued on Jun. 18, 2013 in the related Japanese application No. 2011-533304.

* cited by examiner

ENVIRONMENTALLY COGNIZANT POWER MANAGEMENT

FIELD OF THE INVENTION

The invention relates to power management. In particular, a system and method is presented for optimized power management using collaborative power appliances in data centers and server installations. This application is related to U.S. patent application Ser. No. 12/168,504, entitled, "Automatic Discovery of Physical Connectivity Between Power Outlets and IT Equipment" filed on Jul. 7, 2008 and to U.S. patent application Ser. No. 12/112,435 entitled "System and Method for Efficient Association of a Power Outlet and Device," filed on Apr. 30, 2008.

BACKGROUND OF THE INVENTION

Most business organizations today rely on computing power for their business services, including data analysis, supply chain management, inventory tracking, online transactions and customer support. This computing power comes in the form of web services, web portals and other open source or proprietary applications hosted in either leased or owned data centers. These data centers have become a significant user of electrical power both through the data center computational appliances and indirectly though the humidity and thermal conditioners. Recent data show that almost 50% of power delivered to a server farm is spent on cooling infrastructure, while less than 50% is actually utilized in server consumption. The amount of electrical power used during the computational activity inside the server translates into the thermal load. The amount of electrical power spent to maintain the operational temperature is also dependent on the server air flow characteristics and the relative location of the server hardware within the rack and many other parameters as described later in this disclosure. Even though there is a direct relationship between the computational power utilized by the data center(s) and supplied electrical power, the factors affecting that relationship are many, and the instrumentation and analysis needed to quantify them to the required precision for effective control is challenging. Existing power control mechanisms do not attempt to correlate such utilization with given electrical supply units and hence fall short of global optimization of the power utilization in data centers and server installations. This disclosure describes the systematic procedure and apparatus to achieve such monitoring and control using collaborative server computational power measurements and electrical power units consumed under different environmental operational conditions. This method provides the necessary adaptive learning required to address diverse data center server farms and its infrastructure installations. The heuristics used in this approach take into account the server hardware thermal and electrical requirements and their locations inside the server rack and relative locations within the data center zones.

BRIEF SUMMARY OF THE INVENTION

The innovative system and method increases the efficiency of overall power utilization in data centers by using a power management approach based on a comprehensive, dynamic model of the data center created with integrated environmental and computational power monitoring to correlate power usage with different configurations of business services utilization. This involves intelligent monitoring of thermal conditions and electrical consumption at the relevant electrical power distribution points along with measures of computational load derived from the server hardware behavior, operating systems and application characteristics. The approach also addresses the need and implementation for synchronization of data collection on each such measuring device in the system and the distributed deployments of devices in a heterogeneous environment. The system and method improves the efficiency of electrical power utilization and dynamic computation load balancing capabilities based on application, infrastructure and environmental contexts not present in existing power management solutions.

DETAILED DESCRIPTION OF THE INVENTION

I. Overview

Figure 1:
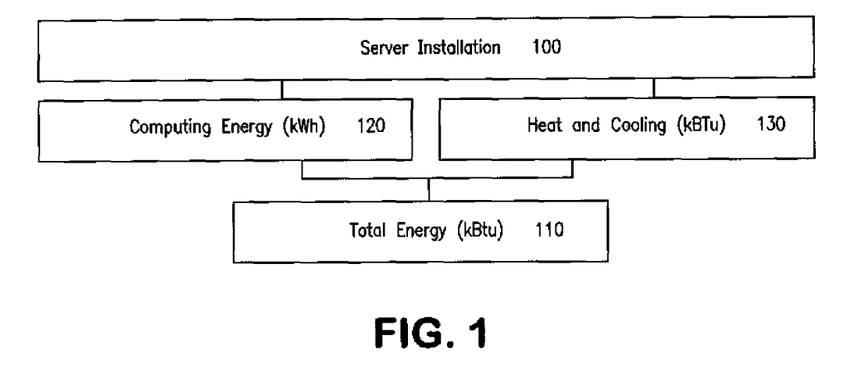
FIG. 1 illustrates major categories of energy consumption.

FIG. 1 depicts the major sections of energy consumption in server installations 100. Total energy 110 is a summation of the power used for computational purposes 120 and the power used for heating and cooling functions 130. Environmentally based power management uses these major consumption areas to minimize the total energy usage in an adaptive manner. The iterative analysis begins by computing the initial measure of total electrical power consumed by the server and network hardware configuration from the asset information. The assets denote the electrical and computing units in the infrastructure that covers server, routers, switches, cooling units, racks, sensors and power distribution panels. This base computation is then supplemented by the electrical power delivered to the cooling and other infrastructure elements. This electrical side power consumption is tracked against the computational power consumed by business services and correlating it with real time electrical metering at the server level. The asset information and other configuration information can either be supplied directly to the power management system or imported from existing IT management systems, which is common in an enterprise level installation. The environmentally conscious power management system and method increases the efficiency of overall power utilization by using coordinated power monitoring at the electrical power distribution side as well as in the consumption side of server installations using simplified common management interfaces (e.g. simple network management protocol (SNMP) web services) for environmental and server monitoring. The system and method improves the efficiency of power utilization per computational unit and provides policies for dynamic load allocation capabilities based on application loads and environmental contexts, e.g. rack configurations, cooling units and thermal characteristics of the data center room. The dynamic computational load balancing policies can be adopted by (i) positioning the servers at environmentally optimized locations, (ii) scheduling the computational tasks at physically diverse locations (ii) VMotion (utility for migration of virtual machines between physical servers offered by VMware) in the virtual environments leveraging virtualization technology. The proposed approach addresses modifications needed to measure the electrical power requirements in such virtualization environments.

A coordinated framework is the most important ingredient to maximize the benefits of information gathered by environmental and server measuring agents denoted as monitors in the figures illustrated herewith. Current practices address local electrical optimization which might not accurately determine the total requirements. In an environment where multiple business services are consolidated at the server level, they might help to reduce the power consumed at each individual server. However, they do not account for thermal operating conditions and thus can become ineffective in situations where those conditions are significant, such as when the servers are configured in a dense arrangement like server blades. In addition to consolidating multiple business services into a single or few servers for minimizing power consumption, it is also important to determine the optimal physical location of that server hardware based on the environmental context. For example, an application running on a server with a rack mounted cooling unit would likely use less overall power than the same application running on an identical server in a less efficient cooling environment. Similarly, an application running on a server with a low power hard drive would likely use less power than the same application running on a server with large power consumption or inefficient heat dissipation design. The selection of servers for load balancing is mostly ad-hoc under current practices and does not involve any detailed analysis.

The most important challenge in power management is the lack of components to correlate the computational processing power (related to services) and electrical power consumption with the accuracy needed for globally optimized load balancing and control. In addition to the challenges needed to monitor a single location environment, IT services in today's enterprises are typically located at geographically distant locations for better utilization of human, time and material resources. These geographic variables are not taken into account in present day electrical power operational profiles due to the lack of a comprehensive solution to address such capabilities. As the business services are rendered from multiple geospatial locations, it is critical to include coordination among electrical power management and computational processing operations at the enterprise level within the global context of business services. The optimization of overall power utilization thus requires a coordinated framework, systematic procedure and control elements to distribute the business computing load both at the physical location and logical locations (as applications in server clusters or virtual machines) by configurable and adaptive monitoring and continuous analysis of the environment for global power management decisions.

The server monitoring tools and appliances employ either agent or non-agent based technologies to measure application load, starting with determining the number of instances of each application running on each server, using different mechanisms primarily depending on the operating systems hosted in the server hardware. Typical monitoring interfaces available for monitoring and measurement include windows management instrumentation (WMI) on Microsoft platforms, simple network management protocol (SNMP), and web services management (WS-MAN). The granularity of the information necessary to associate the application load with the electrical power used is not directly computable from these standard interfaces. Thus it is useful to obtain derived metrics from these existing base metrics that are usable in electrical power computations. The environmentally based power management framework addresses this constraint by aggregating the process level information from different mechanisms (including networked computer monitoring devices such as Raritan's Command Center NOC, baseboard management controllers such as Raritan's KIRA, and power and environmental monitoring devices such as Raritan's Dominion PX) to improve the accuracy of the predicted electrical power unit consumption based on environmental factors, server hardware characteristics, operating system overheads and running applications that provide business services. As shown below, a first level of power metrics is obtained from server hardware and power supply units installed within the servers and a second level of power metrics is obtained from operating system and applications executed within the servers. A third level of metrics is computed from the live monitoring of actual business utilization, configuration, topology, thermal activity and electrical power usage.

Another constraint in the power management operation is that the server monitoring instrumentation and the electrical and environmental monitoring instrumentation are installed separately and maintained independently, thus making calibration and coordination of these measurements relatively difficult. The environmentally cognizant power management system and method integrates both server and environmental monitoring and provides co-operative collection and processing of metrics, thus improving the scope of optimization at the global level. In order to improve the interoperability of measurement devices and distributed data collection, a common information model (CIM) is proposed, and management interfaces that support this CIM profiles are recommended. Intelligent Platform Management Interface (IPMI) is one such standard and Raritan Baseboard management controller (KIRA) and Dominion PX are few examples of monitoring and management devices that support IPMI interface making it suitable for power optimization applications.

The environmentally cognizant power management framework also applies to both virtual and physical server environments. In particular, virtualization technology provides dynamic load balancing operations that help to simplify collaborative power management. As described later, the proposed approach can be adopted to physical server installations as well as virtual server installations.

Figure 3:
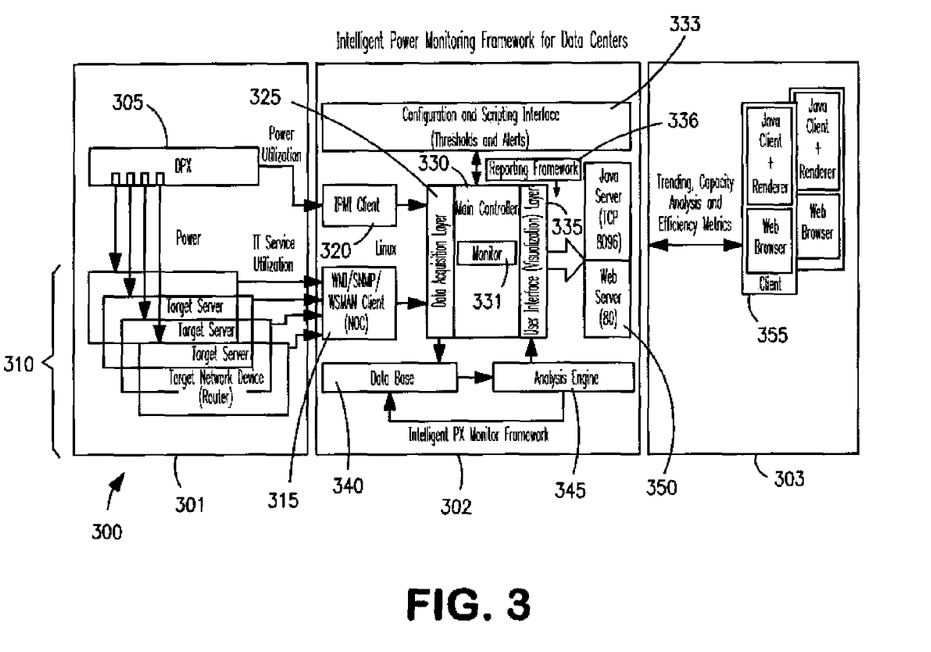
FIG. 3 is an exemplary framework related to the architecture shown in FIG. 2.

In addition to the instrumentation necessary to collect the server computational power metrics and electrical power measurements at desired interfaces during programmed intervals, the synchronization of this information needs to be clearly determined for accurate correlation of events and measurements of both utilization and supply. The management controller in the power optimization (330) system supports the necessary components to order and group the data set collected over multiple interfaces at various time intervals. The information required to compute the long term trending is different from localized short burst of measurements. In such cases, the management controller configures the necessary data collection devices to collect the measurements at different sampling intervals between measurement cycles as necessary.

II. Exemplary Environmentally Congnizant Power Management Architecture and Framework for Server Installations Referring now to FIG. 2, there is shown a system 200 that uses coordinated power management in server installations, data centers and other such constructs. System 200 includes servers 205 and 210 that are connected to a management and monitoring device 215. Servers 205 and 210 may be any computing device in any hardware and software configuration and may include for example, server applications, database applications, web applications and the operating system that hosts the business applications. Management and monitoring device 215 may be Raritan, Inc.'s CommandCenter NOC or any other similar device. Servers 205 and 210 are also connected to power management devices 220 and 225, respectively. Power management devices 220 and 225 may be Raritan, Inc.'s Dominion PX or any intelligent power management device. Management and monitoring device 215 and power management devices 220 and 225 are further coupled to a monitoring, control and analysis device 230 that is accessible by a user via a client interface 235.

Figure 2:
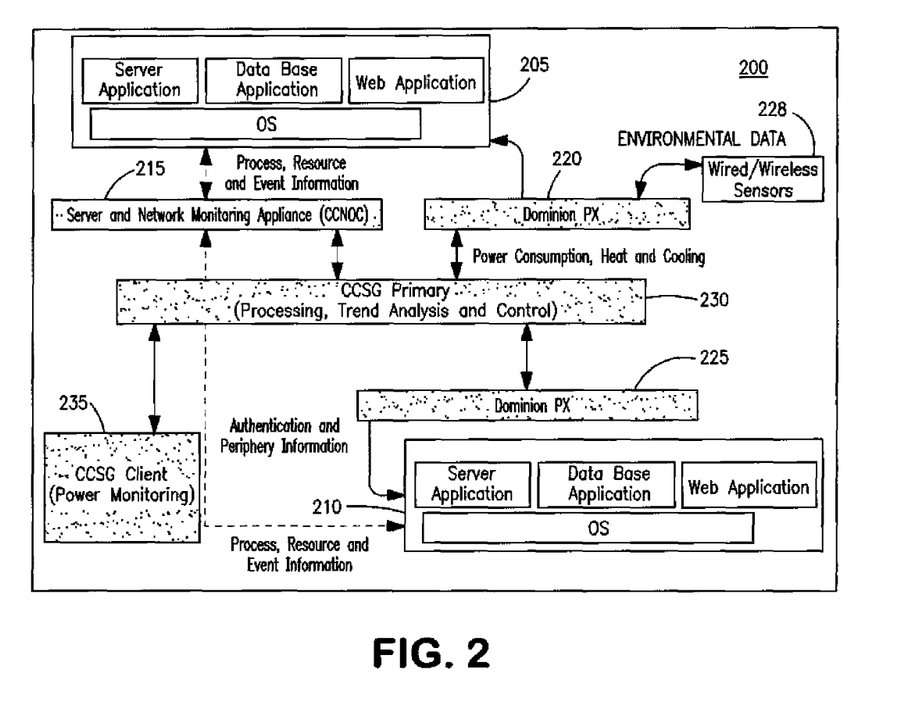
FIG. 2 is an exemplary architecture for power management in a server farm or data center environment.

The environmentally cognizant power management system and method uses the above management components as building blocks for the power management framework. In particular, the management and monitoring device 215 determines in real time the operating system and applications running on each server. In addition, the management and monitoring device 215 monitors server hardware parameters using baseboard management controller hardware that may be available as an embedded module or card, such as for example, in Raritan's KIRA device. These parameters, including the power cycle events and CPU temperature, provide an additional level of power metrics that correlate to the CPU utilization and the computational load created by the business applications. Power management devices 220 and 225 gather information about the electrical power used by each connected device as well as environmental data (primarily temperature, airflow and humidity) via wired and wireless sensor devices. This environmental monitoring integration correlates the energy requirements at the cooling units to the computing load and ambient conditions. The computational load effects electrical power draw which creates thermal energy which in turn effects the electrical power consumed by the cooling supply. The ambient conditions within the data centers affect the efficiency of cooling units, thus necessitating the need for including the location parameters into the dynamic model of the data center. The external ambient conditions also impact the energy needed to operate the cooling and condenser units at the desired operating temperatures and should be incorporated into the model as well.

The interaction of these components in power optimization is detailed in FIG. 2. In this scenario, the business applications are distributed according to an operating profile computed by the centralized processing engine (Main Controller) running in control and analysis device 230. That is, business applications are scheduled to be executed at a particular server based on its efficiency in terms of power and thermal profiles and its position within the rack, location within the server room or facility, as well as environmental conditions. The processing logic in device 230 gathers the environmental conditions from the environmental sensors which are coupled to a common monitor (or integrated into power management devices 220 and 225) and the measurements of electric power usage that are directly available from power management devices 220 and 225. To derive the optimized operating profile for the IT services heuristically by 230, the framework takes into account the following:

First, the current draw and efficiency of the power supply units which convert alternating current (AC) power into direct current (DC) power used inside the server hardware. This information is acquired from the configuration management database (CMDB), known as asset data in IT terminology. The asset information includes the nameplate data that describes the maximum electrical power drawn by the hardware and the inlet and outlet temperatures necessary for proper operating conditions based on its physical design and functional characteristics. In addition to the component level information, the physical location of the racks, the relative distance of servers from the cooling systems and orientation of racks are also fed into the system either from the CMDB, if available, or from other data sources.

Second, the base level power requirements for the operating systems and the applications running on the servers. This is dependent on the utilization of the central processing unit or CPU, the random access memory, hard disks and other resources in addition to the operating system implementation. This information is typically imported from the IT infrastructure system or automatically collected through the baseboard management controller (BMC).

Third, the actual utilization of business computing services within the environmental and chronological context. These process level metrics are obtained by monitoring appliance 215 through WMI and SNMP interfaces at periodic intervals as configured from the main controller.

In order to improve the accuracy of correlating electrical power requirements with the information from various appliances, the measurement data are synchronized to the clock server that runs inside device 230. This sequencing operation on the measurement data acquired from many devices is validated based on the time of arrival of the relative event occurrences before storage for further processing. In addition to the synchronization capabilities, the web services capability automates the discovery and communication between the information provider services and the processing engine which runs in device 230. Before the start of monitoring and data collection, all measurement devices must be discovered and properly registered in order to successfully interpret the events with its context. The context of the operating condition is important to the measurement. For example, the electrical power usage of CRAC (computer room air-conditioner) units in a lightly loaded environment is to be treated differently from the measurement at highly loaded operating condition. The data received throughout the entire system is thus interpreted within the operational context at the global level. The monitored data are now accessible to the receivers, which, in the usual scenario, is the main controller in the system. If there is a failure to receive data from one device or multiple devices, the management controller adapts the next level metrics or derives metrics from previous contexts or earlier data acquisition till the system is back to normal operation. This standard interface of using web-services fit well into such scalable or re-configurable enterprise platform and the proposed approach can be easily adopted into existing infrastructure. The prior art power management for information technology (IT) services does not provide the capabilities of coordinated operations over the network and thus cannot benefit from load balancing across infrastructure and computational equipment in power utilization. The inventive system and method addresses this constraint by provisioning network aware services in each appliance. This facilitates real time synchronization between different units and load migration processing across multiple units. Network enabled web services technology supports both reactive and pro-active power monitoring, which is valuable to complex environments where the behavior of applications experience short-term failures and or irrecoverable crashes. The web services can provide configuration updates and enable re-configuration by subscription methods between peer-to-peer systems, which in this case are the data measurement device, and the data receivers for processing that data.

Where the power (and hence cooling) is of critical importance, server level power monitoring is highly beneficial for information technology management, specifically for auditing, capacity planning, thermal assessment and performance improvement. These scenarios essentially require power usage and active load monitoring on servers to determine the need for rescheduling the load based on pre-defined and/or dynamic power policies. The dynamic power management policies are either stored in the system or referred from an external network management system. Basic level of power profiles are supported at the operating system level and advanced configuration and power interface (ACPI) provide way to control this aspect. The proposed approach applies to any power profiles including ACPI and it uses appropriate metrics for different kind of profiles. Current power policies that utilizes ACPI focus on reliable power feed to the computing units based on the availability of electrical power from alternate sources like uninterrupted power supply (UPS) generators.

Referring now to FIG. 3, there is shown a framework for an intelligent power monitoring system 300 for server farms or data centers in accordance with the invention. In a first phase 301, system 300 has a power management appliance 305 that acts as a power distribution unit ("PDU") to target servers 310 and enables users to measure power at the outlet level providing an accurate view of power consumption at a target server 310 or at a PDU level (total power distributed). Most of the existing power distribution units measure a rack level or branch circuit level power measurements, which might not be sufficient for power optimization at the server level. In a second phase 302, a management and monitoring device 315 collects IT service utilization information from target servers 310 using WMI/SNMP/WS-MAN client interfaces and feeds it to a data acquisition layer 325 of a monitor 331. In addition, an IPMI client interface 320 gathers information from power management appliances 305 and feeds it to the data acquisition layer 325. This is the orthogonal metric and provides the assessment of maximum, minimum and average electrical consumption. Monitor 331 is also coupled to a configuration and scripting interface 333 that inputs thresholds and alerts to the monitor 331. In this description, the monitor refers to the software component that is responsible for monitoring the measurements from the devices obtaining server side metrics (e.g. operating systems, CPU temperature, application instances) as well as those obtaining the electrical side metrics (e.g. power usage, temperature, airflow and humidity). This is the data interface layer of the system and is configurable from the main controller 330. Main controller 330 can define the polling interval, event receiving mechanisms and device topology and interface for communication.

Data acquisition layer 325 in turn feeds it to a database 340. Database 340 is coupled in a feedback arrangement with an analysis engine 345, which supplies processed information to a user interface (visualization and interaction) layer 335 that is coupled to an application server or Web server 350. In a third phase 303, the application server or Web server 350 exchanges the processed information, which includes trend analysis, capacity analysis and efficiency metrics, with a Java client or Web browser 355 at the client side.

The reporting and publishing logic of this framework includes two kinds of information disseminations in either the form of alerts or reports for energy audits. As depicted in the FIG. 3, the derived metrics from the framework ranges from capacity data collection 336 to estimates based on rigorous optimization 345. The reporting of the output of the analysis engine can provide data center efficiency metrics including individual server efficiency in relation to the applications that are running in the data center and the environmental context. The output also provides a heuristically based model of data center power utilization for tracking the trend and adaptive learning. These outputs can be used to optimize power consumption taking into account the desired business services, the server hardware and software characteristics and the data center environmental parameters, including cooling and ventilating facilities. The strength of this framework is the configurable power monitoring logic and retrieval of IT business service dependencies based on heuristic analysis.

Figure 4:
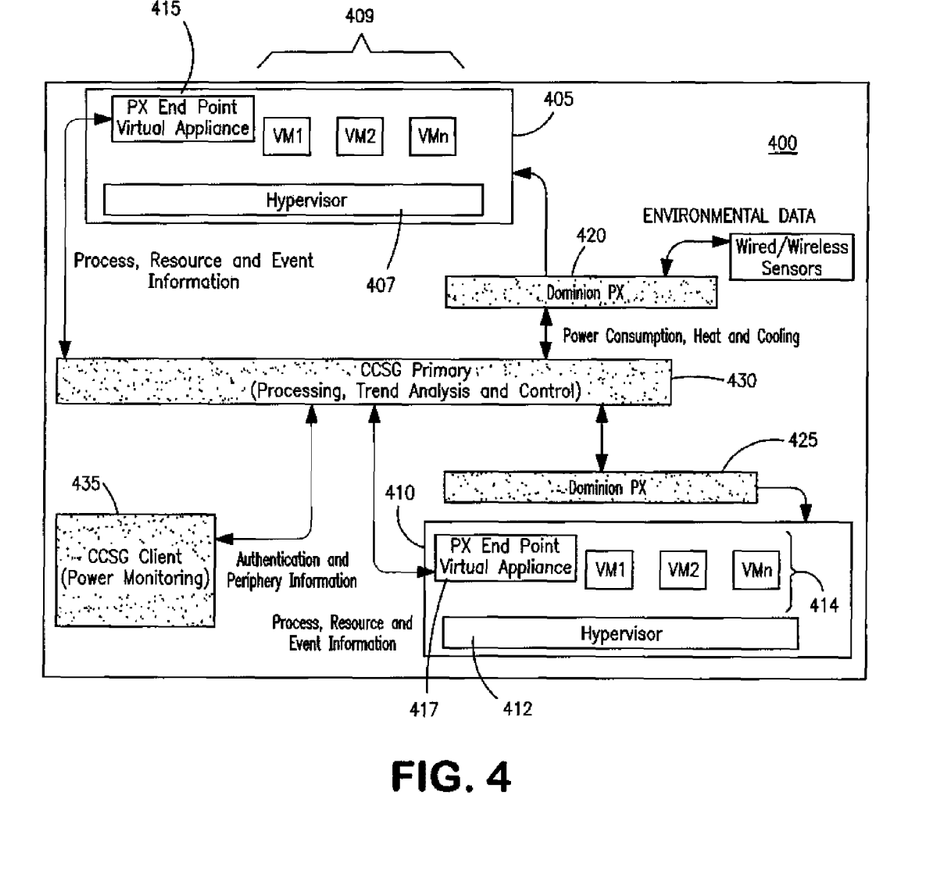
FIG. 4 is an exemplary architecture for power management in a virtual machine environment.

Referring now to FIG. 4, there is shown a system 400 that uses coordinated power management in a virtual machine implementation. System 400 includes servers 405 and 410 that are coupled to a control and analysis device 430 that is accessible by a user via a client interface 435. Servers 405 and 410 may be any computing device that implements a virtual machine environment such as VMware or Xen. In an exemplary embodiment, a hypervisor 407 (412) manages a plurality of virtual machines 409 (414). Servers 405 and 410 are also connected to power management devices 420 and 425, respectively. Each server 405 and 410 has a power management endpoint appliance 415 (417) that monitors all the running processes (computer power) and their resource utilization at the application level in terms of memory, disk and network usage. This is achieved by monitoring the hypervisor APIs supplied by the virtualization server for hardware resources. Device 430 collects this information from devices 405 and 410 and additional information from devices 420 and 425.

In both scenarios illustrated in FIGS. 2 and 4, energy consumption metric is normalized to the power required to operate the core services like operating systems, network, memory, storage and the infrastructure. In an exemplary embodiment, application load may be distributed intelligently among the different physical and logical bins to minimize the total electrical power utilization in terms of computing and cooling.

III. Exemplary Power Management Method for Server Installations

Figure 5:
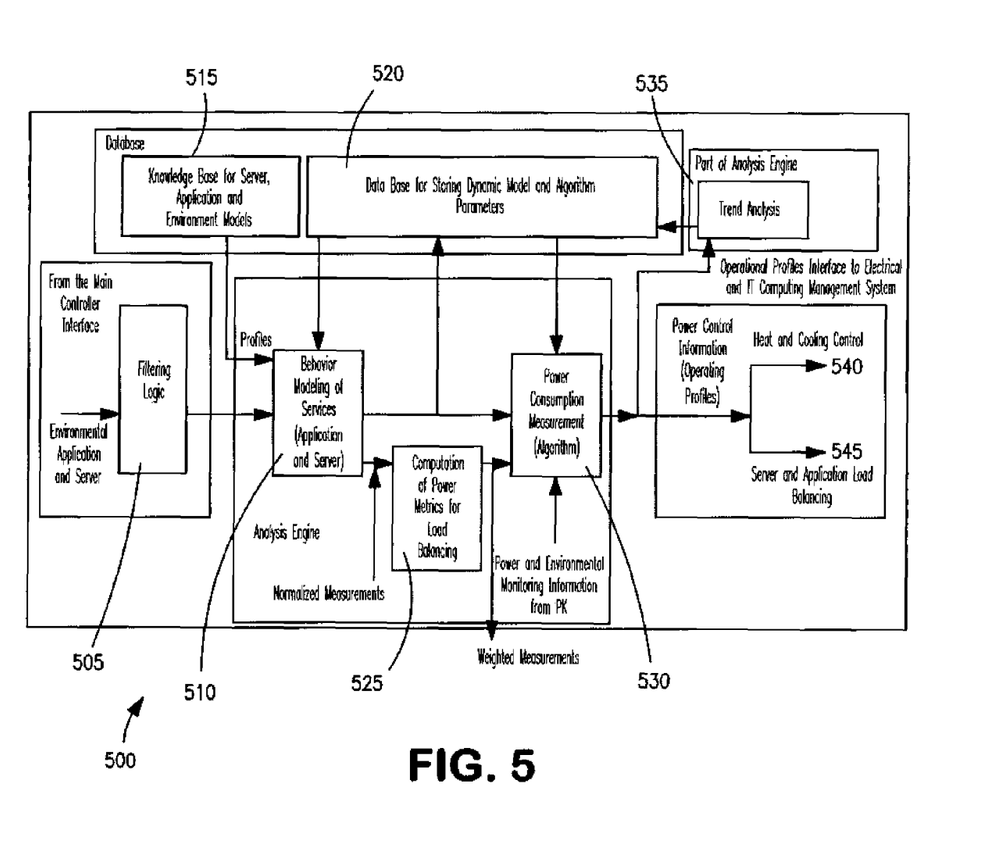
FIG. 5 is an exemplary top level flowchart of the method.

The data driven framework facilitates monitoring and provides interface for dynamic control of electrical and computing power management. This method reduces the cost of equivalent computing power needed by providing the basis for an optimal distribution of total computing load needed by the business at any given time. In general, FIG. 5 shows the stages involved in the power optimization method, which analyzes the present operating conditions in the services context to compute the operational computing and electrical power profiles for effective electrical power utilization for any given computing load. Decision rules may be established according to the criticality of business services, which is configurable by the IT administrators and infrastructure providers. For example, the administrator could decide to place an absolute limit on the aggregate rate of power consumption in the data center and identify certain applications whose execution is to be deferred if the power consumption limit has been met. The output of this stage will be delivered to the control logic stage that allocates the application load among the servers in order to minimize the total power utilization.

Referring now specifically to FIG. 5, a top level flowchart of the inventive method is shown. Environmental, application and server power data is input to a filter 505. Since the volume of data to be collected through device 230 in FIG. 2 and device 430 in FIG. 4 is quite large, filter 505 is implemented at the front end of device 230 and 430. Filter 505 provides the capability to prioritize the information related to electrical power consumption to compute the CPU power metrics that are adequate to correlate with power data received from, for example, devices 220 and 225 in FIG. 2. The filter supplies the short-term details as well as the long-term trends from the data collected across many end nodes and aggregation devices. The CPU usage, main memory, disk I/O and the CPU time slice shared among many virtual machines are examples of metrics that have major impact on the electrical power consumption on that server hardware. A function of the filter 505 is to cumulate such resource utilization into a representation that facilitates mapping between the computational load and electrical power. In a smaller data center with a sufficiently low level of complexity, the filter may not be required, and the resource utilization information will be used as is.

Filtered data is then input to behavior modeling module 510. Workload or business service characterization is performed in advance for common business services and common server platforms to create a basic model for data center power usage. This is stored in knowledgebase 515, providing a second input to module 510. The base modeling of combined characteristics of server and application combinations also helps to reduce the data needed to process the electrical power utilization at any given time of server operation. The workload characteristics are normalized to the hardware parameters acquired from the asset database. A third input to module 510 is database 520 which provides the current dynamic model information and parameters.

Module 510 sends database 520 the information about the current data center configuration and computational loads which is used to update the database if necessary. The current state information is also passed to power metric computation module 525 which uses it to compute the power usage and environmental metrics (e.g. ambient temperature) predicted by the dynamic model. The power consumption measurement module 530 gets information about the existing distribution of application loads among the various servers from module 510 and also gets the predicted power and environmental metrics from module 525. Module 530 acquires information on the actual electrical power and thermal and other environmental conditions through the monitoring inputs from, for example, devices 220 and 225 in a time adjusted and correlated manner. If the predicted data is within defined tolerance limits of the actual data, the dynamic model is validated. If not, the information is output to a trend analysis module 535 which provides feedback for updating and refining the dynamic model and algorithm parameters in database 520.

As the final step, the dynamic model is applied to the current application load to determine if a reallocation of that load among the servers is required for power usage optimization. Given the model to predict power usage based on application load, environmental factors and server hardware and software characteristics, there are numerous methods of making that determination known in the art. For example, a simple approach would be to rank order the servers based on their predicted incremental power draw for an increment of computational load under existing environmental conditions and rank order the applications based on their anticipated schedule of computational load. Starting with the application with the largest load, this process would allocate instances of the applications first to the most efficient server and, as a server's maximum computational load was reached, proceeding to the next most efficient server until done. This approach will yield reasonable results and has the advantages of being simple and fast, but it will often result in a sub-optimal allocation. The better approach of the preferred embodiment develops heuristic rules using a process similar to the back propagation learning algorithms used in neural networks. Neural networks are similar to artificial intelligence methods, trying to model the human learning and intelligence using computer algorithms with the set of neurons and interconnections between themselves based on the learning. In the event that this analysis concludes that a reallocation of application loads or an adjustment to the environmental conditioning infrastructure is required, appropriate instructions are sent to 1) heating and cooling control 540 and 2) server and application load balancing control 545 in order to implement the desired changes.

In general, the major components in the framework for mining the environment for energy conservation include the main controller, monitor, database and analysis engine. The amount of data collected through monitor engine would become unmanageably large and may not be fully utilized for energy data collection. The framework provides an intelligent configuration module that adapts the customer environment after initial run and facilitates capture and analysis of only selected but relevant information pertaining to the electrical and computing energy calculations. The framework is adaptive to collect the measurements at the necessary intervals with needed precision and sampling rate. This module is designed in such a way that the business services and its impact are easily supplemented to the data acquisition and analysis logic. The overall framework either includes the logic to gather asset information of the environment or could be integrated to an external repository. This information is used in the heuristic information for adaptively tracking the association between the electrical and computing power entities. The framework gathers the services and the infrastructure either through the dynamic learning or through a static import. This information is then used as the base for analysis of the services in addition to the typical environment behavior. This increases efficiency in terms of deployment effort and automated learning thereafter. The synchronization of all the individual components in the framework is configurable to an internal time server or to an external network time service.

The approach described creates global profiles for electrical and computing utilizations 545 by systematic processing of power metrics collected using multiple mechanisms for configuration and characterization of various power utilization heuristics. The operational profiles specify the amount of computing load at each server, the location of server to host that computing load and the electrical units delivered to the cooling units on required schedules. The method models the energy consumption at the process level to maximize the accuracy of power optimization across the entire environment. This web services based approach works well for distributed enterprises where the communication framework is extended hierarchically through multiple levels of aggregation and control to gather the dynamic load conditions and load balancing operations at locations remote from the central power management system.

It is understood that FIG. 5 is illustrative only and that other program entry and exit points, time out functions, error checking routines and the like (not shown) would normally be implemented in typical system software. It is also understood that the system software can be implemented to run continuously in an embedded system. Accordingly start blocks and end blocks are intended to indicate logical beginning and ending points of a portion of code that can be integrated into a main program and called as needed to support continuous system operation. Implementation of these aspects of the invention is readily apparent and well within the grasp of those skilled in the art based on the disclosure herein.

Although an exemplary network environment is described above, any network or interconnection of computers, servers, appliances and other devices are applicable and can be used with respect to the method described above. Computers commonly operate in a networked environment using logical connections to one or more computers. The computers used in conjunction with the method may be a personal computer, a server, a router, a network PC, a peer device or other common network node, and typically includes many or all of the elements described above. The connections include but are not limited to local area network (LAN), wide area network (WAN) and other such networking environments that are commonplace in offices, enterprise-wide computer networks, intranets, and the Internet. It will be appreciated that the network connections shown are exemplary and other means of establishing a communications link between the computers may be used. For purposes of illustration, programs and other executable program components such as the operating system are illustrated herein as discrete blocks, although it is recognized that such programs and components reside at various times in different storage components of the computer, and are executed by the data processor(s) of the computer. Different combinations of hardware and software can be used to carry out the teachings of the present invention. A computer or computing device typically includes a processor. A processor typically includes a Central Processing Unit (CPU), such as a microprocessor. A CPU generally includes an arithmetic logic unit (ALU), which performs arithmetic and logical operations, and a control unit, which extracts instructions (e.g., code) from memory and decodes and executes them, calling on the ALU when necessary. "Memory", as used herein, refers to one or more devices capable of storing data, such as in the form of chips, tapes, disks or drives. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further non-limiting example only. Memory may be internal or external to an integrated unit including a processor. Memory preferably stores a computer program, e.g., code or sequence of instructions being operable by a processor.

While the foregoing description and drawings represent the preferred embodiments of the present invention, it will be understood that various changes and modifications may be made without departing from the spirit and scope of the present invention.

What is claimed is:

1. A method for environmentally cognizant power management in a computing environment, comprising the steps of:
   gathering first values for a first level of server power metrics from one or more of servers and power supply units in the computing environment;
   gathering first values for a second level of server power metrics from operating system and applications executed within the servers;
   gathering first values for environmental metrics;
   generating a predictive behavior power utilization model based on at least the first level of server power metrics, the second level of server power metrics and the environmental metrics;
   distributing an application load in the computing environment based on applying the predictive behavior power utilization model to application, utilization and environmental contexts;
   predicting a resulting power utilization according to the predictive behavior power utilization model and the distributed load;
   determining an actual power utilization by gathering second values for the first level of server power metrics and the second level of server power metrics under the application load; and
   updating the predictive behavior power utilization model according to actual power utilization when a difference between the actual power utilization and the predicted power utilization exceeds a predetermined threshold.

2. The method according to claim 1, wherein the application load is distributed to both physical locations and logical locations.

3. The method according to claim 1, further comprising the step of constant monitoring and analyzing the computing environment for power management decisions.

4. The method according to claim 1, wherein the first level of server power metrics, and the second level of server power metrics are gathered from different mechanisms to improve the accuracy of the power metric computation.

5. The method according to claim 1, wherein the behavior model is dynamic.

6. The method according to claim 1, further including the step of temporally synchronizing the first level of server metrics and the second level of server metrics.

7. The method according to claim 1, further including the step of temporally synchronizing the first level of server metrics, the second level of server metrics and the third level of server metrics.

8. The method according to claim 1, wherein a first sampling interval is used to gather data for long term trending analysis and a second sampling interval is used to gather data for localized short term bursty activity.

9. The method according to claim 1, further comprising the step of:
   reallocating the distributed application load according to the adjusted predictive behavior model for improved power utilization.

10. The method according to claim 1, further comprising the steps of:
    adjusting one or more of a heating function or a cooling function; and
    adjusting a power utilization component of the predictive behavior power utilization model that predicts a power utilization of the adjusted heating function or cooling function.

11. A method for environmentally cognizant power management in a distributed computing system, comprising the steps of:
    gathering first values for process level information from a plurality of sources in the distributed computing system;
    gathering first values for environmental metrics for the distributed computing system;
    generating a predictive behavior power utilization model based on the process level information and the environmental metrics;
    allocating an application load among computing elements in the distributed computing system based on applying the behavior model to application, utilization and environmental contexts;
    predicting a resulting power utilization according to the predictive behavior power utilization model and the application load;
    determining actual power utilization information for the distributed computing system by gathering second values for the process level information and the environmental metrics; and
    updating the predictive behavior power utilization model according to the actual power utilization information when a difference between the actual power utilization and the predicted power utilization exceeds a predetermined threshold.

12. The method according to claim 11, wherein the application load is distributed to both physical locations and logical locations.

13. The method according to claim 11, further comprising the step of constant monitoring and analyzing the computing environment for power management decisions.

14. The method according to claim 11, wherein the step of generating uses prioritized process level information.

15. The method according to claim 14, further comprising the step of filtering the process level information to prioritize the process level information with respect to power utilization.

16. Apparatus for environmentally cognizant power management in a computing system, comprising:
a processor that is configured:
to generate a predictive behavior power utilization model based on first values of process level information and environmental metrics received from one or more intelligent power management devices,
to allocate an application load among computing elements in the computing system based on applying the predictive behavior model to application, utilization and environmental contexts,
to predict a resulting power utilization according to the predictive behavior power utilization model and the application load;
to determine actual power utilization information by gathering second values for the process level information and the environmental metrics from the computing system, and
to update the predictive behavior power utilization model according to the actual power utilization information when a difference between the actual power utilization and the predicted power utilization exceeds a predetermined threshold.

17. The apparatus for claim 16, wherein the processor further comprises a filter module that prioritizes the process level information with respect to power utilization.

18. A framework for environmentally cognizant energy conservation, comprising:
an intelligent configuration module that controls information flow and capture pertaining to electrical and computing energy from respective electrical and computing power entities;
a monitor engine in communication with the intelligent configuration module for collecting multiple levels of information pertaining to the electrical and computing energy as directed by the intelligent configuration module; and
an analysis engine coupled to the monitor engine that adaptively tracks an association between electrical and computing power entities based on the information pertaining to electrical and computing energy and environmental information pertaining to the electrical and computer power entities, and adaptively updates a predictive behavior power utilization model based on the information pertaining to the electrical and computing energy when a difference between an actual power utilization and a predicted power utilization according to the predictive behavior power model exceeds a predetermined threshold.

19. The framework of claim 18, wherein the intelligent configuration module and monitor engine collects measurements at predetermined intervals according to defined sampling rates.

* * * * *